(12) United States Patent
Ota (10) Patent No.: US 9,075,656 B2
(45) Date of Patent: Jul. 7, 2015

(54) CLOUD COMPUTING SYSTEM AND METHOD FOR CONTROLLING SAME

(75) Inventor: Shunsuke Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 554 days.

(21) Appl. No.: 13/227,821

(22) Filed: Sep. 8, 2011

(65) Prior Publication Data

US 2012/0072914 A1   Mar. 22, 2012

(30) Foreign Application Priority Data

Sep. 17, 2010   (JP) ................. 2010-208800

(51) Int. Cl.
*G06F 9/455* (2006.01)
*G06F 9/46* (2006.01)
*G06F 9/50* (2006.01)

(52) U.S. Cl.
CPC .............. *G06F 9/5022* (2013.01); *G06F 9/455* (2013.01); *G06F 9/5072* (2013.01)

(58) Field of Classification Search
None
See application file for complete search history.

(56) References Cited

U.S. PATENT DOCUMENTS

| | | | | |
|---|---|---|---|---|
| 7,818,746 | B2* | 10/2010 | Anderson | 718/102 |
| 7,844,839 | B2* | 11/2010 | Palmer et al. | 713/300 |
| 8,296,759 | B1* | 10/2012 | Hutchins et al. | 718/1 |
| 8,572,612 | B2* | 10/2013 | Kern | 718/1 |
| 2005/0081202 | A1* | 4/2005 | Brokenshire et al. | 718/100 |
| 2008/0141220 | A1* | 6/2008 | Kim et al. | 717/120 |
| 2009/0260007 | A1* | 10/2009 | Beaty et al. | 718/1 |
| 2009/0313620 | A1* | 12/2009 | Sedukhin et al. | 718/1 |
| 2009/0320021 | A1* | 12/2009 | Pan et al. | 718/100 |
| 2010/0153945 | A1* | 6/2010 | Bansal et al. | 718/1 |
| 2011/0078303 | A1* | 3/2011 | Li et al. | 709/224 |
| 2011/0299112 | A1 | 12/2011 | Ota | |
| 2011/0314465 | A1* | 12/2011 | Smith et al. | 718/1 |

FOREIGN PATENT DOCUMENTS

JP   2008-234356   10/2008

* cited by examiner

*Primary Examiner* — Tammy Lee
(74) *Attorney, Agent, or Firm* — Fitzpatrick, Cella, Harper & Scinto (57) ABSTRACT

A management application refers to an application management table, and acquires the operation states of all VMs included in an additional application of which the priority related to the execution of a job that has requested from the image forming apparatus. The management application detects the additional application including only VM that is not executing processing based on the operation states of the acquired VMs, and deletes the VM included in the detected additional application.

5 Claims, 9 Drawing Sheets

VMID : VM1
Time : yyyy/mm/dd/hh/mm/ss

FIG. 6B

PROCESSING CONTENT : OCR
PROCESSING TARGET : http://image.jpg
Account : abc
Password : password
STORAGE DESTINATION : http://storage.co.jp/image.jpg

| Application ID | VMID | Status | Priority |
|---|---|---|---|
| Application 1 | VM1 | Working | 1 |
| Application 1 | VM2 | Working | 1 |
| Application 2 | VM1 | Not Working | 2 |
| Application 2 | VM2 | Not Working | 2 |
| Application 3 | VM1 | Reducing | 3 |
| Application 3 | VM2 | Reducing | 3 |

CLOUD COMPUTING SYSTEM AND METHOD FOR CONTROLLING SAME

BACKGROUND OF THE INVENTION

1. Field of the Invention

The present invention relates to a cloud computing system, a method for controlling the same.

2. Description of the Related Art

In recent years, a technology referred to as a "cloud computing system", which is capable of employing various applications operated by a server on the Internet, has been proposed. In the cloud computing system, a cloud service vendor provides a virtual computer (Virtual Machine: VM) and storage on the Internet, and thus is capable of providing various services using these. An application developer pays a usage fee to the cloud service vendor and uses a service provided by the cloud computing system, which allows the application developer to develop a cloud application.

In the application employing the cloud computing system, the performance of the application can be improved by increasing the number of VMs to be used. However, in general, a fee for using a cloud service may be significantly different depending on the number of VMs. Thus, the number of VMs is dynamically increased or decreased depending on the load on an application and the amount of transactions, and a service is provided using the appropriate number of VMs, which is very important from the viewpoint of both performance and cost.

Japanese Patent Laid-Open No. 2008-234356 discloses a system for detecting a reversibly degeneracy-enabled server. While a plurality of servers performs processing in parallel manner, the system measures the processing load on the respective servers. When the processing load is low as a result of measurement, the system detects a server for which processing may be halted based on the dependency of processing performed by the respective servers, and halts processing when possible.

SUMMARY OF THE INVENTION

The cloud computing system of the present invention does not delete an application that includes a VM that is executing a process but deletes a VM that is included in an application other than this application.

According to an aspect of the present invention, a cloud computing system is provided that includes a request reception unit configured to be realized by executing a request reception program that stores a message corresponding to a job in a storage unit in response to the reception of a processing request for the job from an information processing apparatus; a back-end processing unit configured to be realized by executing a back-end processing program that makes an acquisition request for the message to the storage unit at regular intervals, and when the message has been acquired from the storage unit, performs processing based on the acquired message; wherein a plurality of the back-end processing units is activated in the cloud computing system, and each back-end processing unit is incorporated into a processing execution unit that functions as an application, and a deletion unit configured not to delete an application that includes the process execution unit that is executing processes based on the message, but to delete the process execution unit that includes applications other than this application.

Further features of the present invention will become apparent from the following description of exemplary embodiments with reference to the attached drawings.

DESCRIPTION OF THE EMBODIMENTS

When a VM included in an application operating on a system is deleted, assume that a cloud computing system is provided that can specify the number of VMs to be deleted but cannot independently specify the VM(s) to be deleted with respect to the application. In such a cloud computing system, even if an attempt is made to delete a VM that is not processing as an object to be deleted, only a deletion command for specifying the number of VMs may be issued on an application, and thus, VMs other than the VMs to be deleted may undesirably be deleted. For example, when an application to be deleted includes a VM that is executing some processing, the VM that is executing some processing may be deleted in the middle of processing. In such a case, reprocessing is required, and thus, the overall performance of the system may significantly deteriorate. According to the system of the present embodiment to be described below, such drawback can be avoided.

Hereinafter, preferred embodiments of the present invention will now be described with reference to the accompanying drawings. Firstly, a description will be given of the general definition of the term(s) to be employed in the present embodiment. The term "polling" refers to processing in which a client inquires a host about the elapsed state of processing at regular intervals in order to confirm the elapse or completion of processing that has requested from the client to the host. The term "scale-in" means to delete a VM (Virtual Machine) included in an application (cloud application) operating on the cloud computing system. The term "VM" refers to a logical computer that operates with an independent operating system under the environment where a physical server is split into logical computers using a virtual technology. The unit of such logical computer is referred to as "instance".

In the cloud computing system, costs are incurred depending on the number of VMs, and it is important to suppress the cost by performing scale-in when the amount of processing is small. Also, the term "scale-out" means to increase the number of VMs included in the cloud application. In general, in the cloud computing system, the performance thereof may be readily improved by increasing the number of VMs.

Figure 1:
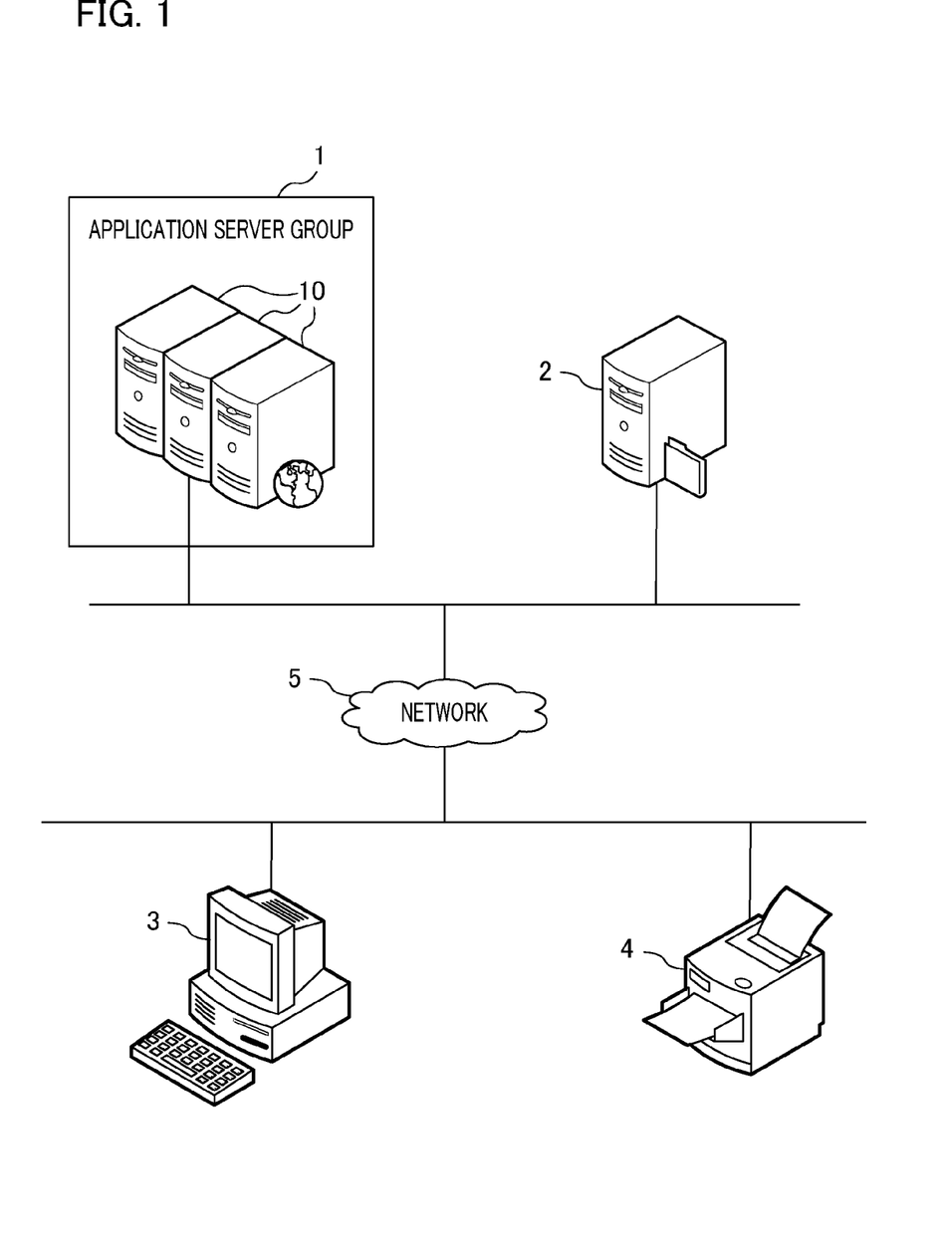
FIG. 1 is a diagram illustrating the general configuration of a system of the present embodiment.

FIG. 1 is a diagram illustrating the general configuration of a system of the present embodiment. The system shown in FIG. 1 includes an application server group 1, a storage server 2, a PC (Personal Computer) 3, and an image forming apparatus 4. The application server group 1 to the image forming apparatus 4 are connected to each other via a network 5. The line of the network 5 may be implemented as a wired or wireless connection.

Each PC 3 and the image forming apparatus 4 is an information processing apparatus that makes a job execution request to the application server group 1, receives the job execution result obtained by the application server group 1, and executes the various processing operations to the received job execution result. For example, the PC 3 makes an acquisition request for information held by the application server group 1 to the application server group 1, and receives information from the application server group 1 in response to the acquisition request to thereby display the received information on a screen. For example, the image forming apparatus 4 makes a print request to the application server group 1, and receives print data from the application server group 1 in response to the print request to thereby perform print processing for the received print data. The PC 3 and the image forming apparatus 4 are disposed at a local area where access from the outside is limited and are blocked by a firewall from the network 5.

The application server group 1 includes a plurality of the application servers 10. The application server group 1 receives a job processing request from the PC 3 or the image forming apparatus 4, and executes the job processing to thereby return the execution result to the request source. For example, the application server group 1 receives a print request from the image forming apparatus 4, executes processing corresponding to the print request with respect to the content stored in a predetermined storage unit, generates print data, and transmits the generated print data to the image forming apparatus 4.

The application server group 1 is a cloud computing system provided in a cloud. The cloud is an area at which a server group is disposed in a cloud computing environment. In the cloud computing environment, a user utilizes computer processing as a service via the network. Access to the inside of the firewall cannot be made by a request made from the application server group 1 provided in the cloud. Accordingly, the application server group 1 communicates with the image forming apparatus 4 by returning a response to the request from the image forming apparatus 4. The method for controlling a cloud computing system of the present embodiment is realized by the application server group 1 shown in FIG. 1. Also, the computer program of the present embodiment causes a computer to execute the method for controlling a cloud computing system of the present embodiment.

Figure 2A:
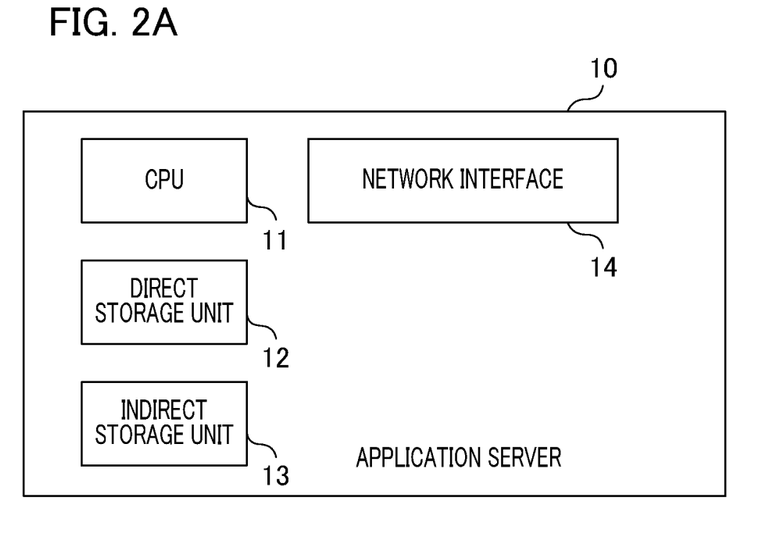
FIG. 2A is a diagram illustrating an example of the hardware configuration of an application server.
Figure 2B:
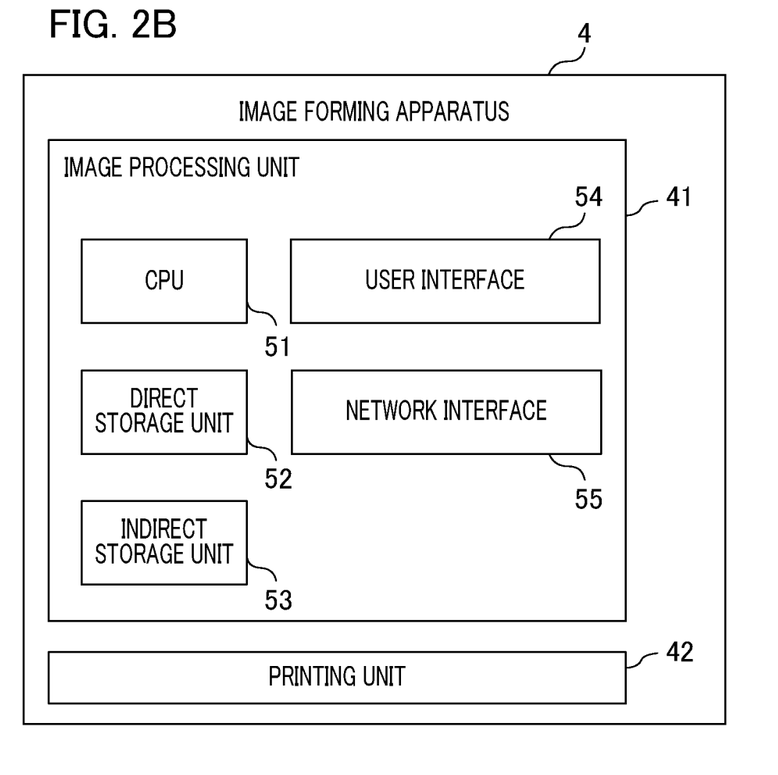
FIG. 2B is a diagram illustrating an example of the hardware configuration of an image forming apparatus.

FIGS. 2A and 2B are diagrams illustrating examples of the hardware configurations of an application server and an image forming apparatus, respectively. FIG. 2A is a diagram illustrating an example of the hardware configuration of each of the application servers 10 included in the application server group 1 shown in FIG. 1.

The application server 10 includes a CPU 11, a direct storage unit 12, an indirect storage unit 13, and a network interface 14. The CPU (Central Processing Unit) 11 is a processing unit that executes a predetermined program to provide instructions for the various types of control of the application server 10. The direct storage unit 12 is a working memory to be used when the CPU 11 executes a program. The program is loaded into the direct storage unit 12. The direct storage unit 12 includes a RAM (Random Access Memory). The indirect storage unit 13 stores an application program and various programs including an OS (Operating System). Various programs stored in the indirect storage unit 13 are moved to the direct storage unit 12 when the CPU 11 executes a program. The indirect storage unit 13 includes a ROM (Read Only Memory) or a HDD (Hard Disc Drive). The CPU 11 may be a multi-processor. The network interface 14 is connected to the network 5 (FIG. 1), and mediates communication between the application server 10 and another device connected to the network 5. Note that the hardware configuration of the storage server 2 and the PC 3 is the same as that of the application server 10 shown in FIG. 2A.

FIG. 2B is a diagram illustrating an example of the hardware configuration of the image forming apparatus 4. The image forming apparatus 4 includes an image processing unit 41 and a printing unit 42. The image processing unit 41 acquires print data from the application server 10, and executes predetermined image processing on the print data. The printing unit 42 prints print data subject processed by the image processing unit 41.

The image processing unit 41 includes a CPU 51, a direct storage unit 52, an indirect storage unit 53, a user interface 54, and a network interface 55. The CPU 51 is a unit that executes a predetermined program so as to provide instructions for the various types of control of the image processing unit 41. The direct storage unit 52 is a working memory to be used when the CPU 51 executes a program. The program is loaded into the direct storage unit 52. The direct storage unit 52 is realized by RAM. The indirect storage unit 53 stores various programs including an application program. Various programs stored in the indirect storage unit 53 are moved to the direct storage unit 52 when the CPU 51 executes a program. The indirect storage unit 53 is realized by as SSD (Solid State Drive) or an HDD. The CPU 51 may be a multi-processor. The user interface 54 has a function that receives an input from a user. The user interface 54 receives an input from a user via equipment such as a touch panel, a mouse, a keyboard, or the like. The network interface 55 is connected to the network 5, and mediates communication with another device connected to the network 5.

Figure 3:
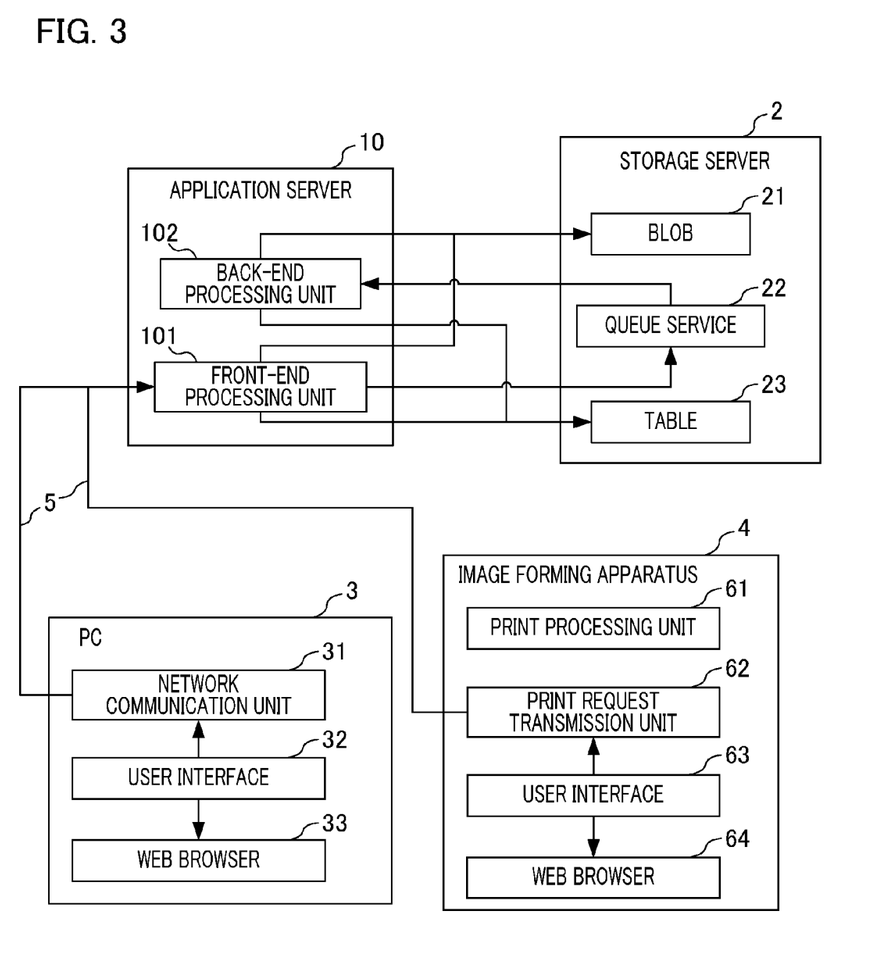
FIG. 3 is a functional block diagram illustrating an example of a system of the present embodiment.

FIG. 3 is a functional block diagram illustrating an example of a system of the present embodiment. The application server 10 included in the application server group 1 includes a front-end processing unit 101 and a back-end processing unit 102. The front-end processing unit 101 functions as a request reception unit that stores a message corresponding to the job in a storage unit (queue service 22), in response to the reception of a job processing request from an information processing apparatus such as the PC 3, the image forming apparatus 4, or the like. The front-end processing unit 101 is realized by executing a request reception program. The front-end processing unit 101 has a functionality equivalent to that of a typical Web server, and is capable of performing synchronization processing. The front-end processing unit 101 has a role of sending processing content, that is, a message corresponding to a job, to the back-end processing unit 102 via the queue service 22.

The back-end processing unit 102 makes an acquisition request for a message to the queue service 22 at regular intervals, and, when the message is acquired from the queue service 22, performs processing (processing described in the message) based on the acquired message. For example, the back-end processing unit 102 returns the processing execution result to the processing request source (the PC 3 or the image forming apparatus 4) via the network 5. The back-end processing unit 102 is realized by executing a back-end processing program. The CPU 11 (FIG. 2A) of the application server 10 executes the back-end processing program. A message is delivered from the front-end processing unit 101 to the back-end processing unit 102 via the queue service 22, whereby the front-end processing unit 101 and the back-end processing unit 102 may be operated in an asynchronous manner.

The storage server 2 includes a blob 21, a queue service 22, and a table 23. The blob 21 stores various data including the processing execution result obtained by the back-end processing unit 102. The blob 21 is realized by the indirect storage unit 13 shown in FIG. 2A. The queue service 22 stores a message corresponding to a job in accordance with the instruction given by the front-end processing unit 101. The queue service 22 is realized by the fact that a queue program, which is stored in the indirect storage unit 13 shown in FIG. 2A, is loaded in the direct storage unit 12 and is executed by the CPU 11. The table 23 provides a storage that holds information including the state of processing performed by the front-end processing unit 101 and the back-end processing unit 102. The table 23 has the same function as that of the known database service.

The PC 3 includes a network communication unit 31, a user interface 32, and a web browser 33. The network communication unit 31 transmits/receives information to/from an external device via the network 5. For example, the network communication unit 31 transmits a job processing request to the application server 10 via the network 5 in accordance with the instruction given by an application operating on the PC 3. Also, for example, the network communication unit 31 receives the job execution result obtained by the application server 10 from the application server 10 via the network 5. The user interface 32 is an interface for employing various applications provided by the PC 3 by a user. The PC 3 executes various applications in accordance with the user's operation input via the user interface 32. The web browser 33, which is one of the applications operating on the PC 3, displays various types of information that are transmitted/received by the network communication unit 31 via the network 5. The web browser 33 is realized by the fact that a program, which is stored in the indirect storage unit 13 shown in FIG. 2A, is loaded in the direct storage unit 12 and is executed by the CPU 11.

The image forming apparatus 4 includes a print processing unit 61, a print request transmission unit 62, a user interface 63, and a web browser 64. The print request transmission unit 62 transmits a job processing request relating to generation and transmission of print data as a print request to the application server 10. The print request includes information relating to print settings set by the user interface 63. The print request transmission unit 62 receives the print data, which has been generated by the front-end processing unit 101, from the front-end processing unit 101 of the application server 10. The print processing unit 61 performs print data print processing. Examples of print data include PDL (Page Description Language), PDF (Portable Document Format), raster image, and the like. The user interface 63 corresponds to the user interface 54 shown in FIG. 2B. The user interface 63 is an interface for employing various applications provided by the image forming apparatus 4 by a user. The image forming apparatus 4 executes various applications in accordance with the user's operation input by the user interface 63. The web browser 64 has a function to display data or information that is stored within a predetermined device connected via the network 5. The web browser 64 is realized by the fact that a program, which is stored in the indirect storage unit 53 shown in FIG. 2B, is loaded in the direct storage unit 52 and is executed by the CPU 51. Also, the web browser 64 may display various types of content such as documents and images, which are present on a network. A user may select content using the user interface 63 to thereby perform a print instruction or the like.

Figure 4:
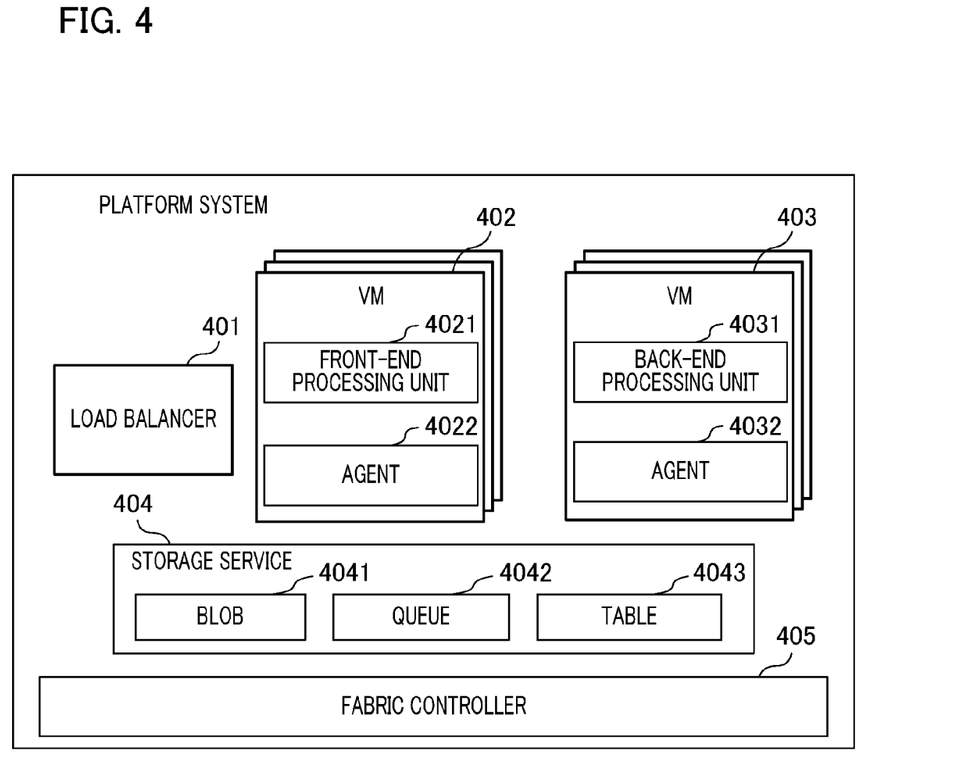
FIG. 4 is a diagram illustrating an example of the platform system of an application server.

FIG. 4 is a diagram illustrating an example of the platform system of an application server. The platform system shown in FIG. 4 realizes the function of the application server 10 shown in FIG. 3. The user of the platform system may employ a physical hardware resource provided in the application server 10 as a computing resource.

The platform system shown in FIG. 4 includes a load balancer 401, VMs 402 and 403, storage service 404, and a fabric controller 405. Each of the VMs 402 and 403 is a processing execution unit that executes predetermined processing. A plurality of the VMs 402 and 403 is provided within the platform system.

The VM 402 includes a front-end processing unit 4021 and an agent 4022. The front-end processing unit 4021 corresponds to the front-end processing unit 101 shown in FIG. 3. The front-end processing unit 4021 receives a processing request from a user via the load balancer 401. The front-end processing unit 4021 has a function that receives a request from an external network. Also, the front-end processing unit 4021 has a function that transmits a processing request to the back-end processing unit 4031 via the queue 4042 to be described below. Also, the front-end processing unit 4021 accesses a fabric controller 505 via the agent 4022. In order to ensure the high availability of the front-end processing unit 4021, a request (e.g., communication via HTTP) from an external network is made through the load balancer 401 external to the VM 402. The load balancer 401 centrally manages a request from an external network, and selectively transfers requests to a plurality of VMs having an equivalent request reception function.

The agent 4022 collects various types of information including the use state of the VM 402, the operation status of the front-end processing unit 4021, the use state of the resource of the VM 402, and error information about the front-end processing unit 4021. The agent 4022 transmits the collected various types of information to the fabric controller 405 at regular intervals.

The front-end processing unit 4021 and the back-end processing unit 4031 are managed by the fabric controller 405. With this arrangement, the scalability and the availability of the respective instances may be ensured. For example, in the front-end processing unit 4021 or the back-end processing unit 4031, assume the case where a certain specific instance may be halted due to failure of a server. In this case, the fabric controller 405 cannot receive a periodical report from the agent 4022 or the agent 4032. The fabric controller 405 that does not receive a periodical report provides instructions to the VM so as to assign processing to a new instance. Consequently, the number of instances that are executing processes is kept constant, whereby processing delay may be suppressed.

The VM 403 is constituted by a back-end processing unit 4031 and an agent 4032. The back-end processing unit 4031 corresponds to the back-end processing unit 102 shown in FIG. 3. The back-end processing unit 4031 receives a processing request from the front-end processing unit 4021 via a queue 4042, and performs processing. The back-end processing unit 4031 accesses the fabric controller 405 via the agent 4032.

The front-end processing unit 4021 and the back-end processing unit 4031 can be scaled in or scaled out. When the front-end processing unit 4021 and the back-end processing unit 4031 are scaled in, the VMs 402 and 403 decrease. In other words, the number of instances in the front-end processing unit 4021 and the back-end processing unit 4031 decreases. When the front-end processing unit 4021 and the back-end processing unit 4031 are scaled out, the number of VMs 402 and 403 increases. In other words, the number of instances in the front-end processing unit 4021 and the back-end processing unit 4031 increases. By performing the scale-out of the front-end processing unit 4021, the load may be distributed even when traffic is increased due to an increase in the number of users. Also, the amount of data processing per back-end processing unit is decreased by performing the scale-out of the back-end processing unit 4031. With this arrangement, a result for the processing request made from a user can be returned more quickly.

When "scale-in" or "scale-out" is actually performed, the cloud computing system of the present embodiment specifies the number by which VMs are to be increased or decreased to an application operating on the system, and issues a scale-out command or a scale-in command. In other words, the cloud computing system of the present embodiment may not uniquely specify a VM to be actually halted when issuing a scale-in command. Thus, when a scale-in command is issued, the cloud computing system of the present embodiment detects an application including only the VM that is not executing processing, and deletes the VM included in the application so as not to delete a VM that is executing processing.

The storage service 404 includes a blob 4041, a plurality of queues 4042, and a plurality of tables 4043. The blob 4041 provides storage that is employed for data storage. The blob 4041 may be associated with meta data. Meta data is represented by a pair of a name and a value. Meta data may be acquired for settings separately from data. The queue 4042 enables the front-end processing unit 4021 and the back-end processing unit 4031 to perform data communication in an asynchronous manner. The front-end processing unit 4021 and the back-end processing unit 4031 perform data communication in an asynchronous manner by providing various instructions to the queue 4042. Here, an instruction that is provided to the queue 4042 by the front-end processing unit 4021 is a message addition instruction, and an instruction that is provided to the queue 4042 by the back-end processing unit 4031 is a message acquisition instruction or a message deletion instruction.

A description will be given of the series of operations that the front-end processing unit 4021 and the back-end processing unit 4031 go through when they perform data communication in an asynchronous manner. The front-end processing unit 4021 generates messages corresponding to a processing request made by a user, and transmits an addition instruction to the queue 4042 so as to add the messages to a queue. The queue 4042 that has received the addition instruction adds the messages to the queue. In order to acquire the messages, the back-end processing unit 4031 provides a message acquisition instruction to the queue 4042. The queue 4042 that has received the message acquisition instruction returns the message, the message ID that is uniquely assigned to each message, and the reception ID as a response to the acquisition instruction to the back-end processing unit 4031. The message ID is unique information that is assigned to each message for uniquely defining the messages. The reception ID is an ID that is used when the back-end processing unit 4031 that has completed processing provides a message deletion instruction. The message, the message ID, and the reception ID are associated to each other for storage.

When the back-end processing unit 4031 has completed a processing request, the back-end processing unit 4031 provides a deletion instruction to the queue 4042 about the message corresponding to the reception ID. The queue 4042 that has received the deletion instruction deletes the message corresponding to the reception ID specified by the back-end processing unit 4031 from the queue. With this arrangement, redundant processing such as processing the same message by the back-end processing unit 4031 other than the back-end processing unit 4031 that has provided a deletion instruction may be prevented from occurring.

Next, the function of making a message added to the queue 5042 invisible or visible will be described in detail. The invisible function is a function in which other back-end processing units 4031 are put in a message unaquirable condition (invisible state) so as not to acquire the same message when back-end processing units 4031 have acquired a message from a queue. Here, the time required for other back-end processing units 4031 to be in a message acquirable condition again (visible state) is referred to as "invisible time". Any time may be set as the invisible time when the front-end processing unit 4021 generates a queue. When processing performed by the back-end processing unit 4031 is not ended during the invisible time, a message changes a visible state, and the back-end processing unit 4031 acquires the message again for processing. Also, even when the back-end processing unit 4031 crashes during processing for some reason and thus the processing cannot be continued, reprocessing cannot be performed during the invisible time. Also, when the processing time exceeds the invisible time, a message of which the process is not completed changes to the visible state, and other back-end processing units 4031 starts processing.

A plurality of the tables 4043 is provided on the storage service 404. Each of the tables 4043 has a unique name. In the present embodiment, the table 4043 includes an application management table 508 (see FIG. 5). A platform user may access a table based on the name of each table. The table 4043 is mainly used for holding the state of service. The table 4043 is constituted by basic data items referred to as an "entity". Entity is constituted by a series of properties. Property represents one of the values in the entity. In the present embodiment, a table is represented in a table format. The table column is referred to as an "entity" and the table row is referred to as a "property".

Figure 5:
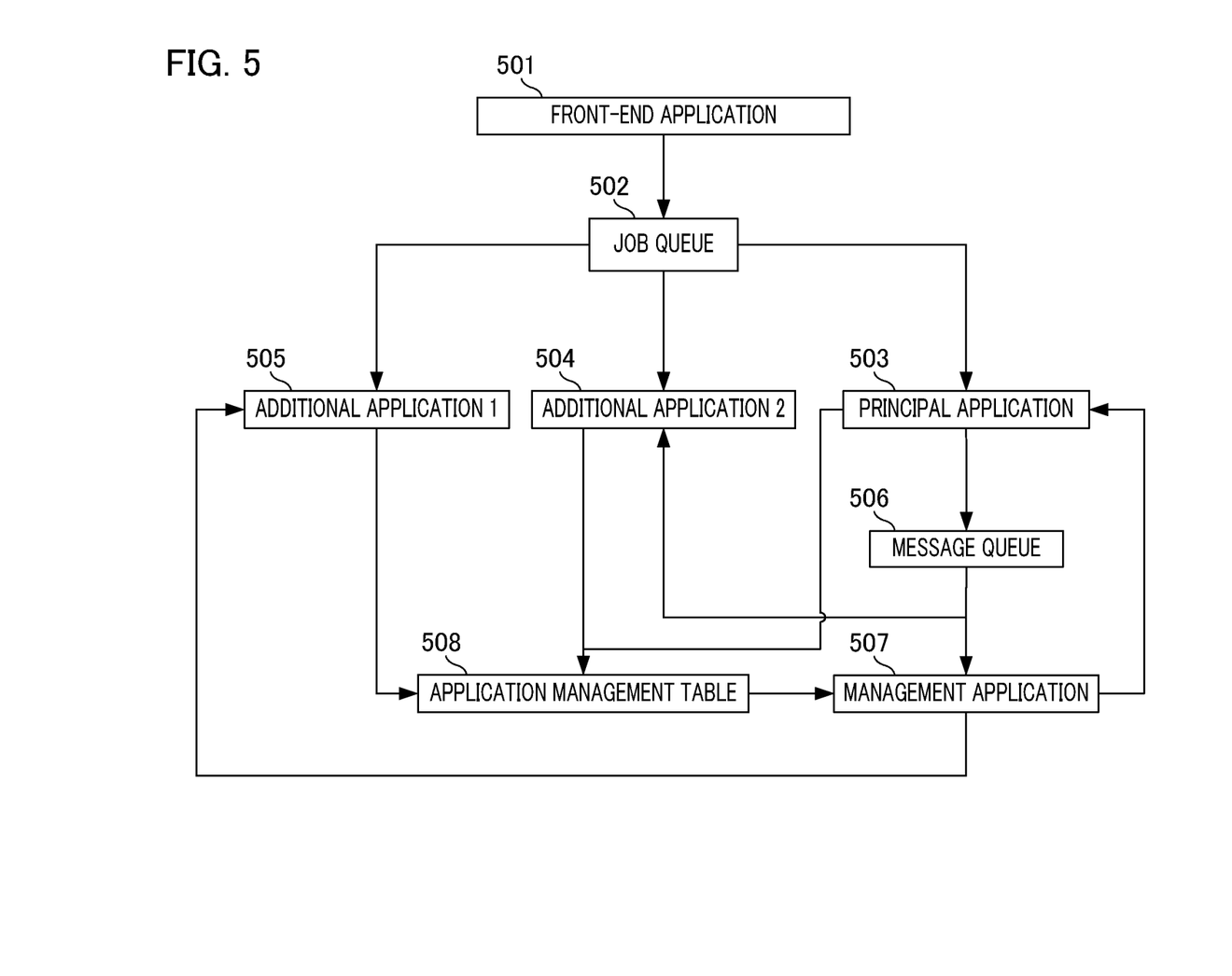
FIG. 5 is a diagram illustrating an example of the configuration of a cloud computing system.

FIG. 5 is a diagram illustrating an example of the configuration of the cloud computing system of the present embodiment. The cloud computing system shown in FIG. 5 includes a front-end application 501, a job queue 502, and a principal application 503. The cloud computing system further includes additional applications 504 and 505, a message queue 506, a management application 507, and an application management table 508. Each application shown in FIG. 5 includes the platform system shown in FIG. 4, and operates on the cloud computing system.

In the cloud computing system of the present embodiment, the configuration in which a single application including all of the VMs required for executing the requested processing is not employed. The cloud computing system of the present embodiment includes a plurality of applications (the principal application 503, the additional applications 504 and 505) into which the aforementioned application has been divided.

At least one VM that is activated is required for carrying out the applications. The front-end application 501 includes a VM including the front-end processing unit 4021 shown in FIG. 4. The front-end application 501 receives a job execution request from the PC 3 or the image forming apparatus 4, and stores a message corresponding to the job in the job queue 502. The job queue 502 corresponds to the queue 4042 shown in FIG. 4.

Among the applications shown in FIG. 5, the principal application 503 and the additional applications 504 and 505 each includes a VM including at least the back-end processing unit 4031. The principal application 503 and the additional applications 504 and 505 each executes processing based on the message acquired from the job queue 502 using the VM. The principal application 503 is an application (first application) including only a VM that is always activated. The principal application 503 is not targeted for scale-in. Each of the additional applications 505 and 504 is an application (second application) that may be targeted for scale-in. In the present embodiment, among the additional applications, an additional application including only a VM that is not processing is targeted for scale-in. For this purpose, the cloud computing system of the present embodiment is arranged such that an application including only a VM that is not processing is readily generated. This will be described below.

Here, a description will be made of the reason why the cloud computing system of the present embodiment includes not only the principal application 503 but also the additional applications 504 and 505 that may be targeted for scale-in. In the system in which an application required for executing the requested processing, that is, processing based on the message is finely divided, and the number of VMs included in each divided application is reduced, a fine scale-in may become possible. However, as described above, since at least one VM is required for each application, the VMs equal to or greater than the number of applications must always be activated, resulting in wasted costs.

For example, assume an application that requires 10 to 30 VMs depending on the operation state of the cloud computing system. Assume the case where 15 applications each including, for example, a single VM are arranged without preparing the principal application 503, and scale-in/scale-out is performed for each application as appropriate. In this case, since the VMs equal to or greater than the number of applications must always be activated, at least 15 VMs are activated. However, since only ten VMs may be enough for actually executing the requested processing, five VMs may be wasted in such a case. On the other hand, when a single principal application including five VMs and five additional applications each including two VMs are prepared, the minimum number of VMs to be activated is ten, and thus wasted cost can be eliminated. Hence, in the cloud computing system of the present embodiment, a principal application including only a VM that is always activated is prepared, and separately from the principal application, an additional application is prepared as an application that may be targeted for scale-in. The number of VMs included in the principal application and the number of additional applications may vary in accordance with the scale of the system to be constructed.

In the present embodiment, the number of VMs included in the principal application 503 is greater than the number of VMs included in the additional application. Also, the VM included in the principal application 503 executes processing based on the message in priority to the VM included in the additional application. In other words, in the state in which none of the VMs included in the principal application 503 are executing processing, the VM included in the additional application operates so as not to execute its own processing. With this arrangement, an additional application including only a VM that is not processing is readily generated.

A further description will be given of a framework for making an additional application including only a VM that is not processing occur easily. As is described below, the application management table 508 includes a priority that corresponds to each application and each VM and relates to the execution of processing based on the message. In the present embodiment, the application management table 508 sets the highest priority to the principal application 503. A VM included in an additional application refers to the application management table 508, and, when none of the VMs included in an application having a higher priority relating to the execution of processing based on the message than that corresponding to said application are executing processing, does not execute its own processing. With this arrangement, an additional application including only a VM that is not processing is readily generated.

The management application 507 monitors the operation state of each application managed by the application management table 508. The management application 507 functions as a deletion unit that detects an additional application including only a VM that is not processing and deletes the VM included in the detected additional application. In other words, the management application 507 does not delete applications that include a VM that is executing a process, but deletes a VM that includes applications other than this application.

The job queue 502 is a queue that is used for passing the processing content, which the PC 3 or the image forming apparatus 4 has requested to the front-end application 501, to the principal application 503 and the additional applications 504 and 505. The message queue 506 is a queue that is used for providing communication between the management application 507 and the principal application 503. An application management table is a table that manages the operation state of each application.

Figure 6A:
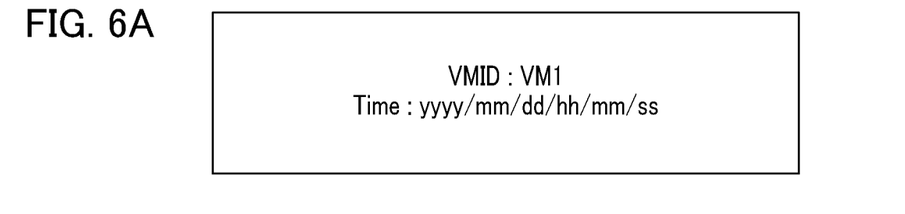
FIG. 6A is a diagram illustrating an example of the message stored in a job queue.
Figure 6B:
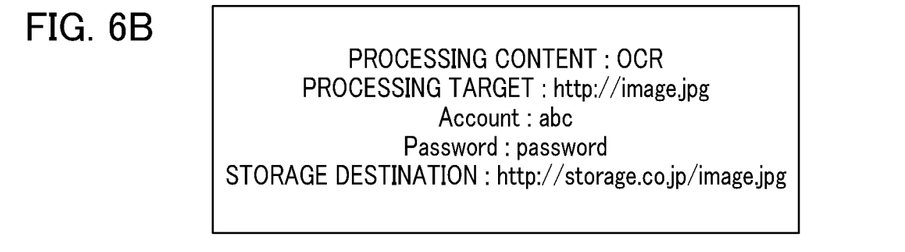
FIG. 6B is a diagram illustrating an example of the message stored in a message queue.
Figure 6C:
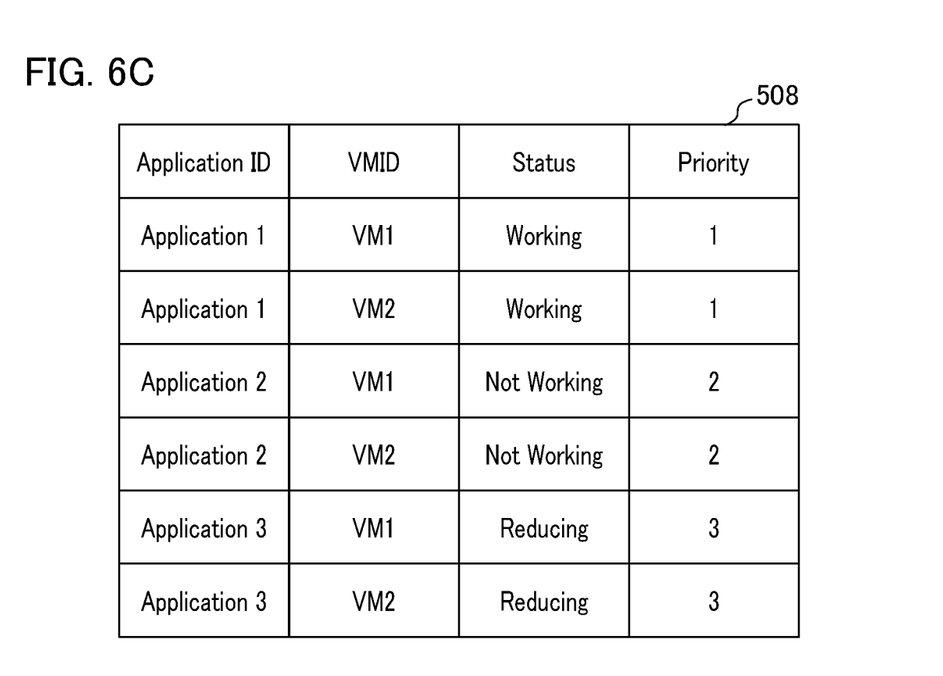
FIG. 6C is a diagram illustrating an example of an application management table.

FIGS. 6A to 6C are diagrams illustrating examples of the message stored in a job queue, the message stored in a message queue, and an application management table, respectively. FIG. 6A is a diagram illustrating an example of the message stored in the job queue 502. The message is a message corresponding to an image processing job. The message includes OCR as processing content, a path to the file to be processed, an account and password for gaining an access to an external storage storing a file, and storage destination information about the file subject to image processing, where OCR is an abbreviation for Optical Character Recognition.

FIG. 6B is a diagram illustrating an example of the message stored in the message queue 506. When the VM included in the principal application 503 performs polling to a job queue and no message is stored (no processing), a message having a format shown in FIG. 6B is stored in the message queue 506. The message includes the ID of the VM which has performed polling, and the time at that polling was conducted.

FIG. 6C is a diagram illustrating an example of the application management table 508. The application management table 508 functions as a management unit that manages the operation states of the VMs included in the principal application and additional application and priorities, which are associated with the respective applications and VMs, as management information. The aforementioned priority is the priority relating to the execution of processing based on the message by each VM, that is, the priority relating to the execution of a job that has been requested from the image forming apparatus 4 or the like. A VM and an application having a higher priority firstly execute processing based on the message.

More specifically, the application management table 508 has data items such as an application ID, VMID, Status, and Priority. The application ID is identification information for uniquely identifying an application. VMID is identification information for uniquely identifying a VM included in an application. Status indicates the operation state of a VM. The status "Working" set in Status means that a VM is performing some processing. Each VM confirms an application management table 701 prior to the start of processing, and changes the value of Status for entity corresponding to its own VMID. The status "Not Working" represents the state where a VM is not carrying out processing. After the completion of processing, each VM changes the value of Status for the entity having its own VMID, which is stored in the application management table 508.

The management application 507 provides a scale-in command to an application for which the Status of all VMs are "Not Working". The status "Reducing" represents the state that a scale-in command is being issued. In general, in the cloud computing system, a VM is not halted immediately after the issuance of a scale-in command but is halted after the elapse of a certain time. Thus, even after the issuance of a scale-in command, a VM may start processing. Accordingly, prior to the issuance of a scale-in command, the management application 507 changes the Status corresponding to all VMs, which are included in the application of a command issuance destination in the application management table 508, to "Reducing". With this arrangement, the VM of which the Status is "Reducing" is controlled so as not to start processing.

Priority indicates the priority relating to the execution of processing based on the message. The smaller the value stored in Priority, the higher the priority. In the present embodiment, the VM included in the principal application 503 is set with higher priority than that of the VM included in the additional application. With this arrangement, since the VM included in the additional application executes processing only when all of the VMs included in the principal application 503 are executing processing, an additional application including only a VM that is not processing is readily generated.

Figure 7:
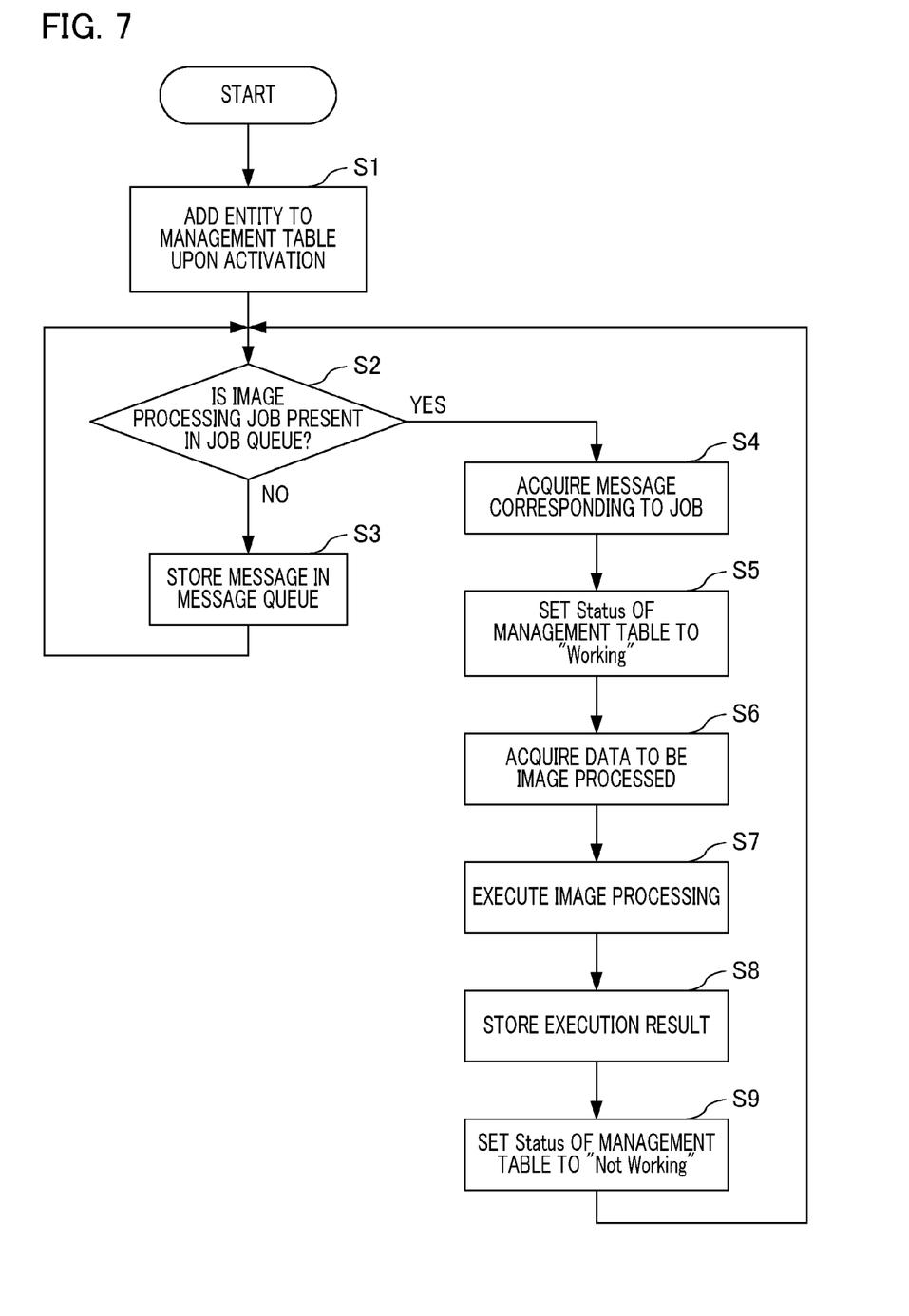
FIG. 7 is a flowchart illustrating an example of principal application processing.

FIG. 7 is a flowchart illustrating an example of principal application processing. The processing as described with reference to FIG. 7 is processing performed by the VM included in an application, and the VM included in the same application performs the same processing (the same goes for the processing of the flowchart shown in FIG. 8). In this example, the job to be processed is intended to be a job corresponding to image processing.

Firstly, upon activation of a VM included in the principal application 503, the VM adds its own entity to the application management table 508 (step S1). The VM sets the Status and the Priority of the entity to "Not Working" and 1, respectively, in the application management table 508.

Next, the VM performs polling with regard to the job queue 502, and determines whether or not a message for a job corresponding to image processing is present in the job queue 502 (step S2). When a message for a job corresponding to image processing is absent in the job queue 502, the process advances to step S3. Then, the VM stores a message containing the current time in the message queue 506 (step S3), and the process returns to step S2.

When a message for a job corresponding to image processing is present in the job queue 502, the VM acquires a message corresponding to the job (step S4). Subsequently, the VM sets the Status of the entity, which corresponds to the entity's own VMID of the VM, to "Working" in the application management table 508 (step S5).

Next, the VM acquires data to be image processed in accordance with the information described by the message acquired from the job queue 502 (step S6). Subsequently, the VM executes image processing to the data to be image processed in accordance with the information described by the message acquired from the job queue 502 (step S7). The VM stores the image processing execution result obtained in step S7 in storage such as the blob 4041 or the like (step S8). Then, the VM sets the Status of the entity, which corresponds to the entity's own VMID of the VM, to "Not Working" in the application management table 508 (step S9), and the process returns to step S2.

Figure 8:
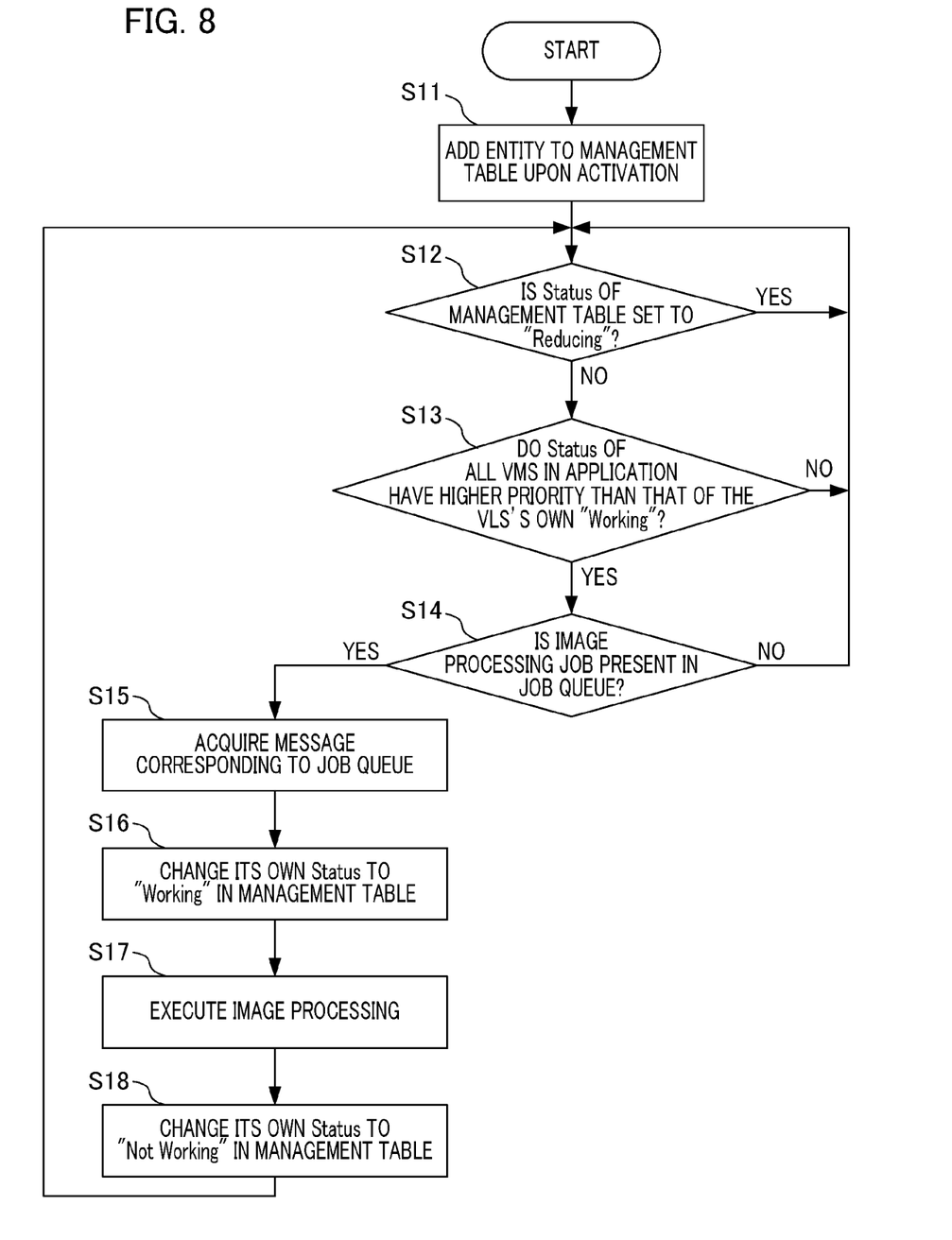
FIG. 8 is a flowchart illustrating additional application processing.

FIG. 8 is a flowchart illustrating additional application processing. In this example, a description will be given of processing performed by the VM included in the additional application 504 shown in FIG. 5. Upon activation, the VM included in the additional application 504 adds its own entity to the application management table 508 (step S11). The VM sets the Status of the entity to "Not Working" in the application management table 508. Also, the VM sets its own Priority. The value of the Priority set by the VM has a value which is 1 greater than the greatest number from the values of the Priorities for other applications that have already been set in the application management table 508.

Next, the VM determines whether or not the Status of the entity, which corresponds to the entity's own VMID of the VM, is "Reducing" in the application management table 508 (step S12). When the Status is "Reducing", the process advances to step S12. When the Status is not "Reducing", the process advances to step S13.

Next, the VM refers to the application management table 508, and determines whether or not the Status of all of the VMs included in an application having a higher priority than its own is "Working" (step S13). When the Status of any VM included in an application having a higher priority than its own is not "Working", the process returns to step S12. When the Status of all of the VMs included in an application having a higher priority than its own is "Working", the process advances to step S14.

Next, the VM performs polling with regard to the job queue 502, and determines whether or not a message for a job corresponding to image processing is present in the job queue 502 (step S14). When a message for a job corresponding to image processing is absent in the job queue 502, the process returns to step S12. When a message for a job corresponding to image processing is present in the job queue 502, the VM acquires a message for the job (step S15). Subsequently, the VM changes the Status of the entity corresponding to the VMID of its own to "Working" in the application management table 508 (step S16).

Next, the VM acquires data to be image processed in accordance with the information described by the message acquired from the job queue 502, and executes image processing for the data (step S17). In step S17, the VM further stores the image processing execution result in storage such as the blob 4041 or the like. Then, the VM changes the Status of the entity corresponding to the VMID of its own to "Not Working" in the application management table 508 (step S18), and the process returns to step S12.

As described with reference to FIG. 8, each of the VMs included in the additional application 504 refers to the operation state and the priority of the VM managed by the application management table 508, and performs the following processing. The VM determines whether or not all the VMs included in an application having a higher priority than that corresponding to its own are executing processing (see step S13). The VM executes processing only when all the VMs included in an application having a higher priority than that corresponding to its own are executing processing (Yes in step S13, and steps S14 to S17). In other words, the VM does not execute processing when any one of the VMs included in an application having a higher priority than that corresponding to its own is not processing (No in step S13). With this arrangement, an additional application including only a VM that is not processing is readily generated.

Figure 9:
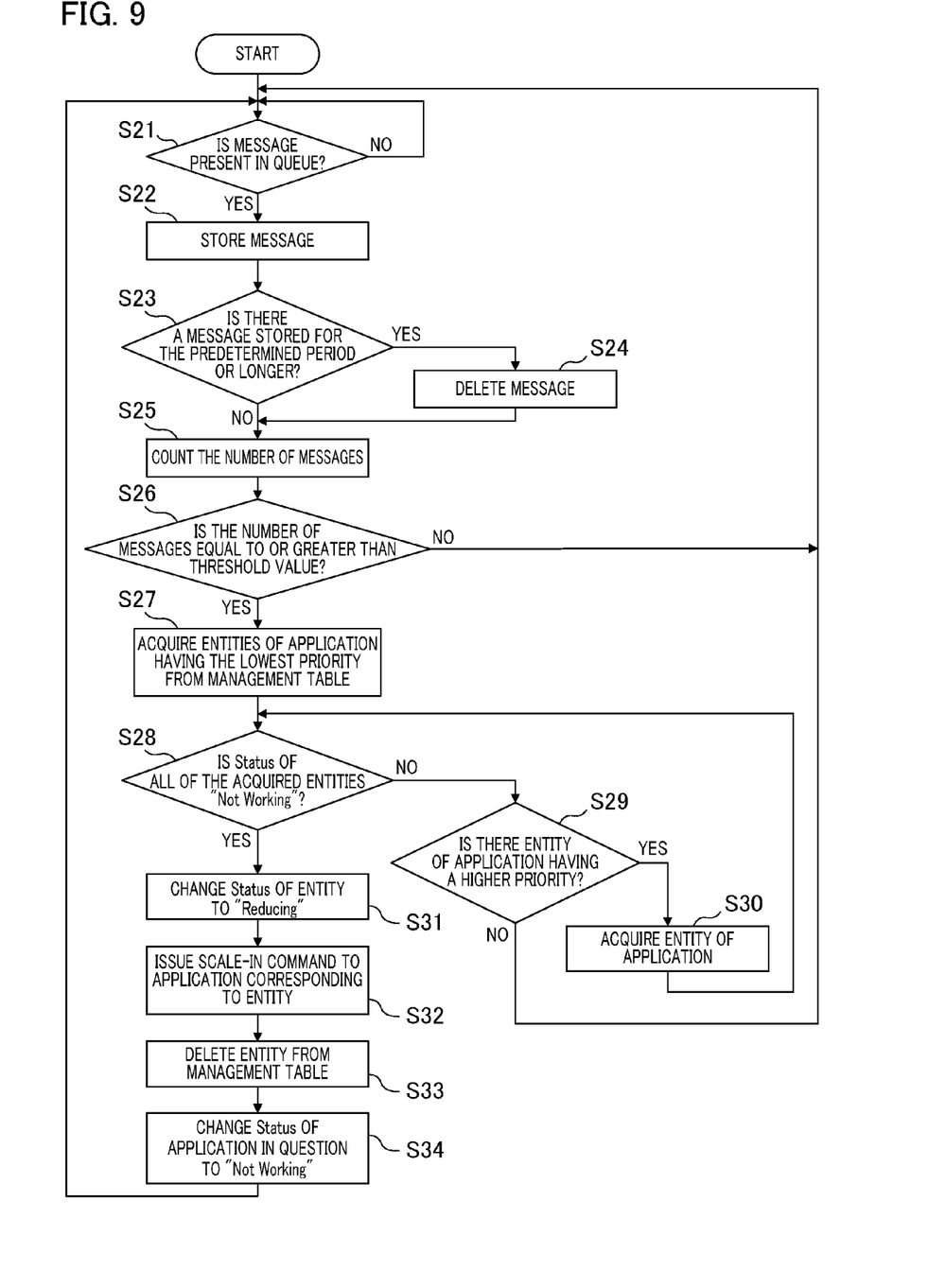
FIG. 9 is a flowchart illustrating management application processing.

FIG. 9 is a flowchart illustrating management application processing. The management application 507 performs polling with regard to the message queue 506, and determines whether or not a message(s) is present in the message queue 506 (step S21). When there is no message(s) in the message queue 506, the process returns to step S21. When a message (s) is present in the message queue 506, the management application 507 acquires the message(s) from the message queue 506 for storage (step S22). In the present embodiment, it is assumed that the message storage destination is set to be the local area of the VM included in the management application 507. The management application 507 may store a message(s) in the table 4043, the blob 4041, or the like shown in FIG. 4.

Next, the management application 507 determines that the VM is subject to scale-in when a number of times that the VM included in the principal application 503 was incapable of acquiring the message(s) from the job queue 502 is equal to or greater than a threshold value. More specifically, the management application 507 performs the following processing, and determines whether or not the number of messages equal to or greater than a predetermined number has been stored in the message queue 506 for a predetermined amount of time. Then, the management application 507 determines that the VM is subject to scale-in when the number of messages equal to or greater than a predetermined number has been stored in the message queue 506 for a predetermined amount of time.

In other words, the management application 507 determines whether or not there is a message stored for the predetermined period of time or longer among the messages stored in step S22 (step S23). When there is a message stored for the predetermined period of time or longer, the management application 507 deletes the message stored for the predetermined period of time or longer (step S24).

When there is no message stored for the predetermined period of time or longer, the management application 507 counts the number of stored messages (step S25). Subsequently, the management application 507 determines whether or not the number of counted messages is equal to or greater than a predetermined threshold value (step S26). When the number of counted messages is not equal to or greater than a predetermined threshold value, the process returns to step S21. When the number of counted messages is equal to or greater than a predetermined threshold value, the management application 507 calculates the number of VMs corresponding to the message (the number of VMID described in the message), and the process advances to step S27.

The management application 507 refers to management information managed by the application management table 508, and acquires the entities corresponding to all VMs included in an application having the lowest priority (step S27). In other words, the management application 507 acquires the operation states of all VMs included in an additional application having the greatest Priority value.

Next, the management application 507 determines whether or not the Status of all of the acquired entities is "Not Working" (step S28). In other words, the management application 507 determines whether or not the additional application includes only VM that is not executing processing based on the operation states of all the acquired VMs.

When the Status of any one of the acquired entities is not "Not Working", the management application 507 executes the following processing. The management application 507 determines whether or not there is an entity having a higher priority than those included in the entities acquired in step S27 (step S29). When there is no entity having a higher priority than those included in the entities acquired in step S27, the process returns to step S21. When there is an entity having a higher priority than those included in the entities acquired in step S27, the management application 507 acquires the entity (step S30), and the process returns to step S28.

When the Status of all of the acquired entities is "Not Working", the management application 507 changes the Status of the entity to "Reducing" (step S31). Subsequently, the management application 507 issues a scale-in command to an additional application corresponding to the application ID included in the entity of which the Status has been changed to "Reducing" (step S32). More specifically, the management application 507 provides instructions for deleting VMs in a quantity equal to the number of VMs corresponding to the counted messages calculated in step S26 to the additional application. The additional application that has received a scale-in command deletes the instructed number of VMs.

Next, the management application 507 deletes the entities including the application ID of the additional application from the application management table 508 by a number equivalent to the VMs for which the deletion has been instructed to the additional application (step S34). Then, the management application 507 changes the Status of the entity including the same application ID as that included in the entity that has been deleted in step S34 to "Not Working" (step S34), and the process returns to step S21.

According to the cloud computing system of the present invention described above, an application that includes a VM that is executing processing is not deleted when the scaling-in (deletion) of a VM is performed, but a VM that includes applications other than this application is deleted. More specifically, the cloud computing system may readily detect an application including only VMs that are not executing processing to thereby delete the VM included in the application. Therefore, the VM that is executing some processing is not deleted, and thus, the occurrence of reprocessing may be prevented. Consequently, the overall performance of the system is improved.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-208800 filed Sep. 17, 2010, which is hereby incorporated by reference herein in its entirety.

What is claimed is:

1. A cloud computing system comprising at least one application server that communicates with an information processing apparatus via a network, wherein the at least one application server comprises:
   a central processing unit and at least one memory;
   a request reception unit constructed to execute a request reception program that stores a message corresponding to a job in a storage unit in response to reception of a processing request for the job from the information processing apparatus;
   a back-end processing unit constructed to execute a back-end processing program that makes an acquisition request for the message to the storage unit at regular intervals, and when the message has been acquired from the storage unit, performs processing based on the acquired message;
   wherein a plurality of back-end processing units are activated in the cloud computing system, and each back-end processing unit is incorporated into a processing execution unit included in an application;
   a calculation unit constructed to calculate a number of the back-end processing units to be deleted based on a number of messages stored in the storage unit;
   a determination unit constructed to determine a processing execution unit in a state in which all of the back-end processing units incorporated into the processing execution unit are not performing a processing, among the plurality of processing execution units; and
   a deletion unit constructed to instruct to delete the number of the back-end processing units included in the processing execution unit calculated by the calculation unit to the processing execution unit determined by the determination unit,
   wherein the application comprises a first application including only a processing execution unit that is activated all the time, and a second application that is different from the first application,
   wherein the number of the processing execution units included in the first application is greater than the number of the processing execution units included in the second application,
   wherein the processing execution unit included in the first application executes processing based on the message in priority to the processing execution unit included in the second application, and
   wherein the determination unit determines the second application as including only the processing execution unit that is not executing processing based on the message, and the deletion unit instructs to delete the number of the back-end processing units to the processing execution unit included in the second application.

2. The cloud computing system according to claim 1, further comprising:
   a management unit constructed to manage the operation states of the processing execution units included in the first and second applications and priorities, which are associated with the respective applications and processing execution units and relate to the execution of processing based on the message by the respective processing execution units, as management information,
   wherein the deletion unit refers to management information managed by the management unit, and detects the second application including only the processing execution unit that is not executing processing based on the message.

3. The cloud computing system according to claim 2,
   wherein the deletion unit refers to management information managed by the management unit and acquires the operation states of all the processing execution units included in the second application of which the corresponding priority is the lowest when the number of times that the processing execution unit included in the first application was incapable of acquiring the message from the storage unit is equal to or greater than a predetermined threshold value, determines whether or not the second application includes only the processing execution unit that is not executing processing based on the message on the basis of the operation states of all the acquired processing execution units, and provides instructions to the second application about the deletion of the processing execution unit included in the second application when the second application includes only the processing execution unit that is not executing processing based on the message.

4. The cloud computing system according to claim 2,
   wherein the respective processing execution units included in the second application refer to the operation states and the priorities of the processing execution units managed by the management unit, determine whether or not all the processing execution units included in an application having a higher priority than that corresponding to the second application are executing processing based on the message, and executes processing based on the message only when all the processing execution units included in an application having a higher priority than that corresponding to the second application are executing processing based on the message.

5. A method for controlling a cloud computing system comprising at least one application server that communicates with an information processing apparatus via a network, the method executed by the application server comprising:
   storing, by a request reception unit constructed to execute a request reception program, a message corresponding to a job in a storage unit in response to reception of a processing request for the job from an information processing apparatus;
   processing, by a back-end processing unit constructed to execute a back-end processing program, an acquisition request for the message to the storage unit at regular intervals, and when the message has been acquired from the storage unit, performing processing based on the acquired message,
   wherein a plurality of back-end processing units are activated in the cloud computing system, and each back-end processing unit is incorporated into a processing execution unit included in an application;
   calculating a number of the back-end processing unit to be deleted based on a number of messages stored in the storage unit;
   determining a processing execution unit in a state in which all of the back-end processing units incorporated into the processing execution unit are not performing a processing, among the plurality of processing execution units; and
   instructing to delete the number of the back-end processing units included in the processing execution unit calculated by the calculation unit to the processing execution unit determined by the determination unit, wherein the application comprises a first application including only a processing execution unit that is activated all the time, and a second application that is different from the first application, wherein the number of the processing execution units included in the first application is greater than the number of the processing execution units included in the second application, wherein the processing execution unit included in the first application executes processing based on the message in priority to the processing execution unit included in the second application, and wherein the determining step determines the second application as including only the processing execution unit that is not executing processing based on the message, and deleting step instructs to delete the number of the back-end processing units to the processing execution unit included in the second application.

* * * * *